(12) United States Patent
Lu

(10) Patent No.: US 12,126,372 B2
(45) Date of Patent: Oct. 22, 2024

(54) STAND FOR A HANDHELD DEVICE, MEANS THEREOF, AND A PROTECTIVE CASE HAVING SAME

(71) Applicant: Evolutive Labs Co., Ltd., Taichung (TW)

(72) Inventor: Jui-Chen Lu, Taichung (TW)

(73) Assignee: EVOLUTIVE LABS CO., LTD., Taipei (TW)

( * ) Notice: Subject to any disclaimer, the term of this patent is extended or adjusted under 35 U.S.C. 154(b) by 391 days.

(21) Appl. No.: 17/826,728

(22) Filed: May 27, 2022

(65) Prior Publication Data

US 2023/0170928 A1 Jun. 1, 2023

(30) Foreign Application Priority Data

Nov. 30, 2021 (TW) .................................. 110144549

(51) Int. Cl.
*H04B 1/3877* (2015.01)
*H04M 1/04* (2006.01)

(52) U.S. Cl.
CPC ............ *H04B 1/3877* (2013.01); *H04M 1/04* (2013.01)

(58) Field of Classification Search
CPC ......... F16M 11/2021; F16M 2200/024; F16M 2200/08; F16M 11/10; F16M 11/105; F16M 11/041; F16M 13/04; F16M 11/38; H04B 1/3877; H04M 1/04; H04M 1/185
See application file for complete search history.

(56) References Cited

U.S. PATENT DOCUMENTS

| | | | |
|---|---|---|---|
| 6,129,237 A * | 10/2000 | Miyahara | G06F 1/1626 220/255 |
| 8,428,664 B1 | 4/2013 | Wyers | |
| 8,567,832 B2 | 10/2013 | Kannaka | |
| 8,950,638 B2 | 2/2015 | Wangercyn | |
| 9,300,346 B2 * | 3/2016 | Hirsch | A45F 5/021 |

(Continued)

FOREIGN PATENT DOCUMENTS

| CN | 102022603 A | 4/2011 |
|---|---|---|
| CN | 109008099 A | 12/2018 |

(Continued)

OTHER PUBLICATIONS

Office Action mailed Jan. 19, 2023 in parallel U.S. Appl. No. 17/932,926.

(Continued)

*Primary Examiner* — Cindy Trandai
(74) *Attorney, Agent, or Firm* — MUNCY, GEISSLER, OLDS & LOWE, P.C.

(57) ABSTRACT

The invention relates to a stand for a hand-held device and a protective case comprising the stand. The stand comprises a first base, a second base, a first elastic sheet, a second elastic sheet and a limiting device. The first ends of the first elastic sheet and the second elastic sheet are respectively arranged on the two sides of the first base. The limiting device enables the second end of the first base and the second end of the second base to slide separately and not overlap each other within a limited range. When the second end of the first elastic sheet and the second end of the second elastic sheet carry out a first relative displacement, the first base and the second base forms a second relative displacement.

26 Claims, 13 Drawing Sheets

(56) References Cited

U.S. PATENT DOCUMENTS

| | | | |
|---|---|---|---|
| 9,372,507 B2* | 6/2016 | Dekock | G06F 1/1626 |
| 9,407,743 B1* | 8/2016 | Hirshberg | H04B 1/385 |
| 10,063,272 B1* | 8/2018 | Yeo | A45F 5/00 |
| 10,561,228 B2* | 2/2020 | Britt | H04B 1/3877 |
| 10,652,379 B2 | 5/2020 | Holder | H04M 1/04 |
| 10,694,837 B1* | 6/2020 | Altschul | H04M 1/04 |
| D894,889 S * | 9/2020 | Feller | D14/251 |
| 10,855,821 B1* | 12/2020 | Chou | H04B 1/3877 |
| 10,911,587 B1* | 2/2021 | Duval | H04B 1/385 |
| 11,140,970 B2* | 10/2021 | Yeo | A45F 5/00 |
| 11,274,697 B2 | 3/2022 | Srour | |
| 11,486,532 B1* | 11/2022 | Wang | F16M 11/38 |
| 11,530,779 B2 | 12/2022 | Epstein et al. | |
| 11,572,977 B2* | 2/2023 | Murphy | A45C 11/00 |
| 11,736,135 B2* | 8/2023 | Shaw | H04B 1/3877 |
| | | | 455/575.1 |
| 2009/0095854 A1 | 4/2009 | Forbes et al. | |
| 2011/0050063 A1* | 3/2011 | Wang | H04N 1/00127 |
| | | | 248/351 |
| 2012/0325999 A1 | 12/2012 | Yang et al. | |
| 2014/0054910 A1* | 2/2014 | Kim | H04B 1/3888 |
| | | | 294/158 |
| 2015/0011269 A1* | 1/2015 | Liu | H04M 1/0202 |
| | | | 455/575.1 |
| 2015/0335138 A1 | 11/2015 | Juarbe | |
| 2016/0036480 A1 | 2/2016 | Hirsch | |
| 2016/0069512 A1 | 3/2016 | Grieve | |
| 2016/0134733 A1* | 5/2016 | Murphy | A45F 5/00 |
| | | | 455/575.6 |
| 2016/0273702 A1* | 9/2016 | Shiba | F16M 13/005 |
| 2016/0345715 A1* | 12/2016 | Lin | A45C 11/00 |
| 2018/0299923 A1 | 10/2018 | Kuo | |
| 2018/0302114 A1 | 10/2018 | Nielsen | |
| 2020/0208773 A1* | 7/2020 | Lin | H04B 1/3888 |
| 2021/0059370 A1* | 3/2021 | Del Toro | F16M 11/10 |
| 2021/0084132 A1* | 3/2021 | Chou | G06F 1/1681 |
| 2022/0146039 A1* | 5/2022 | Cheswick | F16M 11/10 |
| 2022/0304457 A1 | 9/2022 | Cornish et al. | |
| 2023/0056720 A1* | 2/2023 | Goonetilleke | G06F 1/1669 |
| 2023/0165347 A1* | 6/2023 | Lu | F16M 11/10 |
| | | | 248/685 |
| 2024/0121332 A1* | 4/2024 | Ho | F16M 13/04 |

FOREIGN PATENT DOCUMENTS

| | | |
|---|---|---|
| EM | 008709638-0001 | 10/2021 |
| EM | 008709638-0002 | 10/2021 |
| EM | 008709638-0003 | 10/2021 |
| EM | 008709638-0004 | 10/2021 |
| EM | 008709638-0005 | 10/2021 |
| EM | 008709638-0006 | 10/2021 |
| EM | 008709638-0007 | 10/2021 |
| JP | 3235994 U | 1/2022 |
| KR | 10-2017-0031782 A | 3/2017 |
| WO | WO-2020/009795 A1 | 1/2020 |
| WO | WO-2022/212136 A1 | 10/2022 |

OTHER PUBLICATIONS

An English translation of the Office Action issued for corresponding KR application No. 10- 2021-0141065 dated Dec. 20, 2022, 11 pages.

An Office Action issued for corresponding IN application No. 202224012146 dated Dec. 19, 2022 with English translation, 5 pages.

* cited by examiner

STAND FOR A HANDHELD DEVICE, MEANS THEREOF, AND A PROTECTIVE CASE HAVING SAME

CROSS-REFERENCES TO RELATED APPLICATIONS

This application claims the benefit of the Taiwan Patent Application No. 110144549 filed on Nov. 30, 2021, the subject matter of which is incorporated herein by reference.

BACKGROUND OF THE INVENTION

Field of the Invention

This invention relates to a stand for use with a handheld device, especially relates to a foldable stand for use with a bigger sized cell phone or a tablet.

Descriptions of the Related Art

Most of the existing handheld devices have rich entertainment functions, such as video and audio playback, e-book reading and electronic games, etc. Therefore, users often need to continuously use the handheld device, and sometimes turn it from portrait to landscape, so as to be closer to the visual ratio of normal screens. However, due to the flat shape of the handheld device, it does not conform to the ergonomics of the handheld. The user often accidentally drops the handheld device and damage it due to various reasons (such as sore hands, too little friction force, and lack of concentration, etc.). In addition, if the user does not want to hold the handheld device for a long time while watching movies or video, it is needed to have a support against the back of the device, or put it on an extra bracket or tripod, which will cause additional problems such as improper viewing angle. Those are quite inconvenient overall.

Therefore, some people began to put forward the technical means to solve the above problems. A simple retractable stand was attached to the back of the mobile phone, which could be directly attached to the back case of the phone, attached to the protective case, or directly integrated with the protective case for users to purchase products with a stand directly when buying the protective case. Those kinds of stands are most in the foldable "ring" type; however, because of the "ring-type" stand is small in overall size, it should be placed in a right position to facilitate the user's appropriate finger to go through and hold the phone, also at the same time, requiring the cell phone is at a good location. That location often does not provide the phone in in a good viewing angle, and even cannot let the phone to be in a good standing position, not to mention this situation can allow the larger size of the tablet electronic device to be controlled by the user. That is, there is no flexibility of use for the user to freely sustain a mobile phone or tablet in the portrait or landscape position. In other words, the "ring" stand, because of its small size, usually cannot provide both of the desired functions for a perfect support and an anti-drop. Also, the "ring" stand is usually made of metal, it needs a pivoting structure to fold up the ring when not being in use, therefore the thickness of the whole stand cannot be that thin. Further, its shape is irregular and asymmetric, and as a whole is not good-looking. Unless there are other auxiliary mechanism to add on, the phone with the ring-type stand cannot perfectly and flatly lie on the table in a low profile. In overall, it is still a very bad design.

In addition to the "ring" design, some ideas were developed later such as those disclosed in the Chinese Patent Nos. CN305843674S and CN305381641S, which use a flexible strap fixed at one end with the other end being provided with a button, so that the button can slide along a track. When in use, the flexible strap is arched up to a shape like a caterpillar's body, forming an "Ω" shape that lets a user's finger pass through and that is also able to support the phone. Nevertheless, this design is just a similar idea of the above-mentioned "ring" type with using different material to make the user feels more comfortable a bit because the user's finger differently touches the non-metal material. This design does not considerably improve the ring-type stand afterwards.

Recently, some other ideas try to make a breakthrough over the above ring type and provide another sort of stand that can provide spaces to receive credit cards. For example, a South Korean Brand named "SlashGo" used a staggered leather belt design trying to eliminate the shortcomings of the existing stands that are over-protruding out of the back of the phone, making the phone cannot levelly lie on the table in a smooth condition. Also, its states of use between unfolding and folding up are obviously troublesome, and not quite easy and compact. And the leather used for this product is not durable and hard to resist dirt and water. Therefore, it still cannot be popularized.

In view of this, a functional retractable stand needs be researched and developed. No matter it is attached to the back of the phone or attached to the outer surface of the protective case for use with the phone, it can obtain a good support and adjust the best viewing angle of the phone, and other excellent performance in the use state even for the normal or larger-sized phones and tablets. In the fold-up state, it can keep the smallest and most uniform protruding size without influencing the good-looking appearance of the original phones or tablets.

SUMMARY OF THE INVENTION

An objective of this invention is to provide a stand for supporting a handheld device. The stand has a first base and a second base, in which the first base is raised and lowered relative to the second base by an elevating device between the first base and the second base. The elevating device includes a limiting device to limit the first base to be raised to a first dead point and lowered to a second dead point, relative to the second base, during the elevating process of the first base to the second base.

Another objective of this invention is to provide a stand for supporting a handheld device, in which the limiting device guides an end portion of a first elastic sheet and an end portion of a second elastic sheet to move along a longitudinal direction within a limited range, and the first elastic sheet and the second elastic sheet do not overlap with each other; thereby when the end portion of the first elastic sheet and the end portion of the second elastic sheet move to be close to each other, the first base and the second base are driven to close to each other.

Yet another objective of this invention is to provide a stand for supporting a handheld device, in which the limiting device guides an end portion of a first elastic sheet and an end portion of a second elastic sheet to move along a longitudinal direction within a limited range, and the first elastic sheet and the second elastic sheet do not overlap with each other; thereby when the end portion of the first elastic sheet and the end portion of the second elastic sheet move to be close to each other, the first base and the second base are driven to depart from each other.

Further another objective of this invention is to provide a protective case which is disposed on the back of a of a cell phone, in which the protective case includes the above-mentioned stand.

DESCRIPTION OF THE PREFERRED EMBODIMENT

Figure 1A:
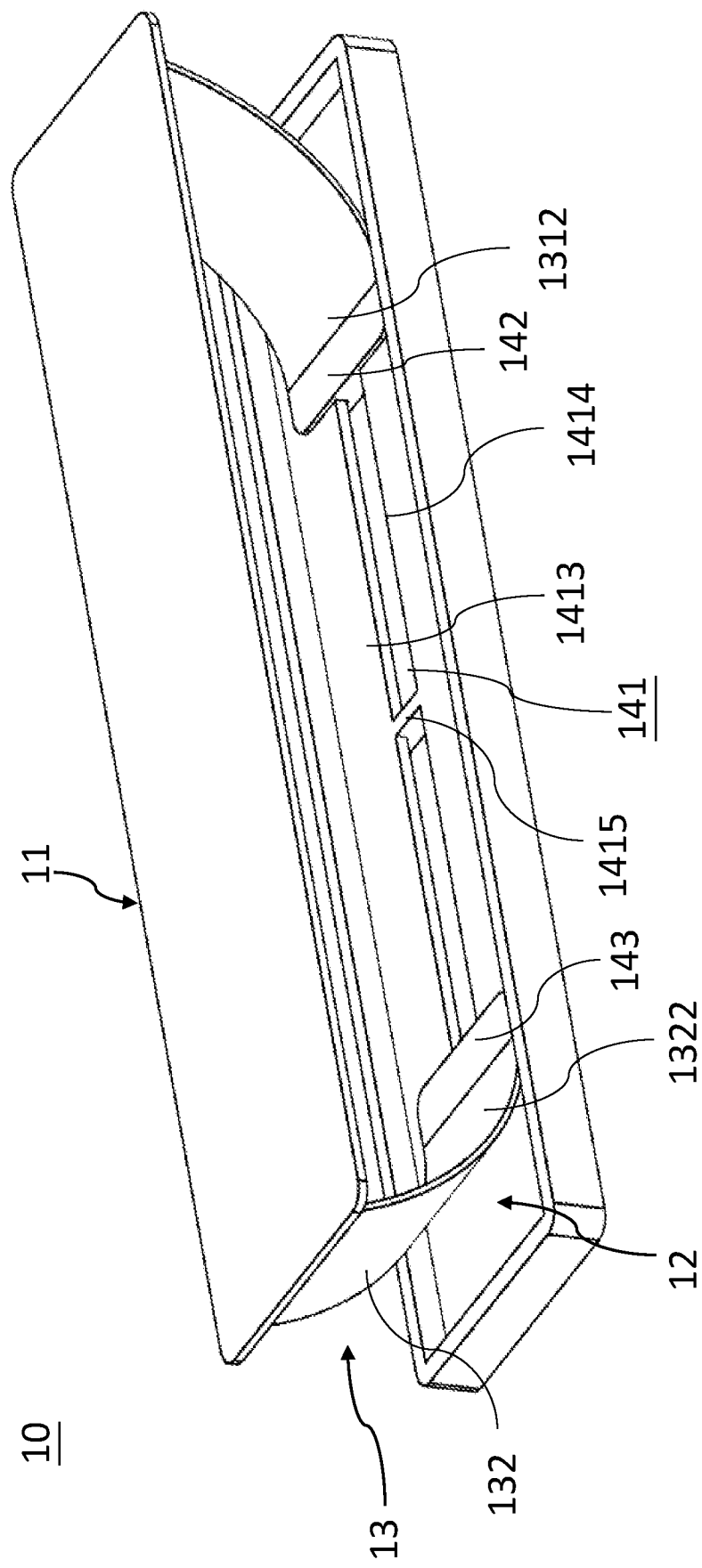
FIG. 1A shows a perspective view of the first embodiment of this invention, in which the stand is in the state of being completely raised.
Figure 1B:
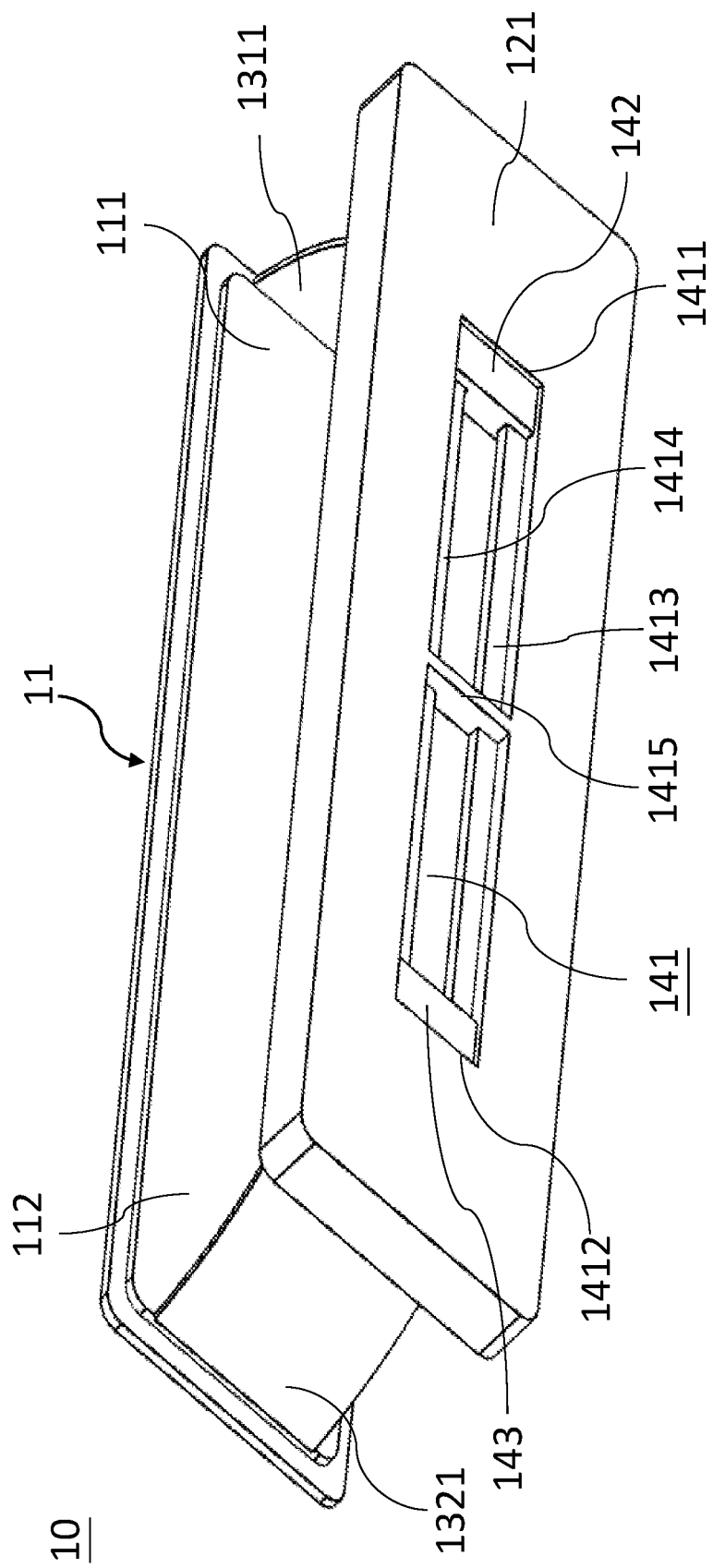
FIG. 1B is another perspective view of FIG. 1A.

The first embodiment of the present invention is described below, as shown in FIG. 1A. The stand 10 includes a first base 11, a second base 12 opposing to the first base 11, and an elevating device 13 which is disposed between the first base 11 and the second base 12. The elevating device 13 has a first elastic sheet 131 and a second elastic sheet 132. The first elastic sheet 131 includes a first end portion 1311 and a second end portion 1312, and the first end portion 1311 is connected to a first area 111 of the first base 11. The second elastic sheet 132 includes a first end portion 1321 and a second end portion 1322, in which the first end portion 1321 is connected to a second area 112 of the first base 11. Preferably, the first area 111 refers to an inner side of one of two ends of the first base, and the second area 112 refers to an inner side of the other of the ends of the first base 11. The angle of the view from FIG. 1B is easier to be presented. It should be well understood that the "connected to" as referred to hereinbefore includes, but is not limited to, any possible ways of being "disposed on" such as "integrally formed on", "inserted into" or "glued on".

Figure 1C:
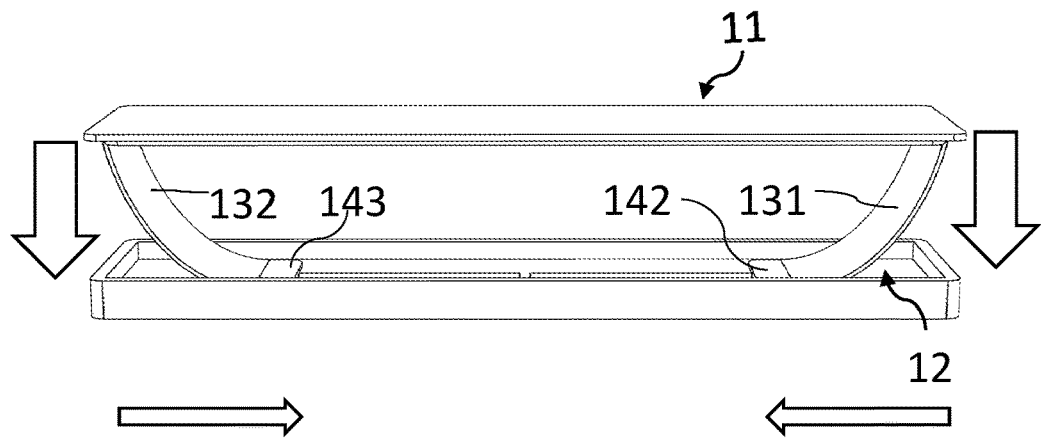
FIGS. 1C, 1D and 1E show schematic views of the first embodiment of this invention, in which the stand is in the process between being fully raised and fully folded-up.
Figure 1D:
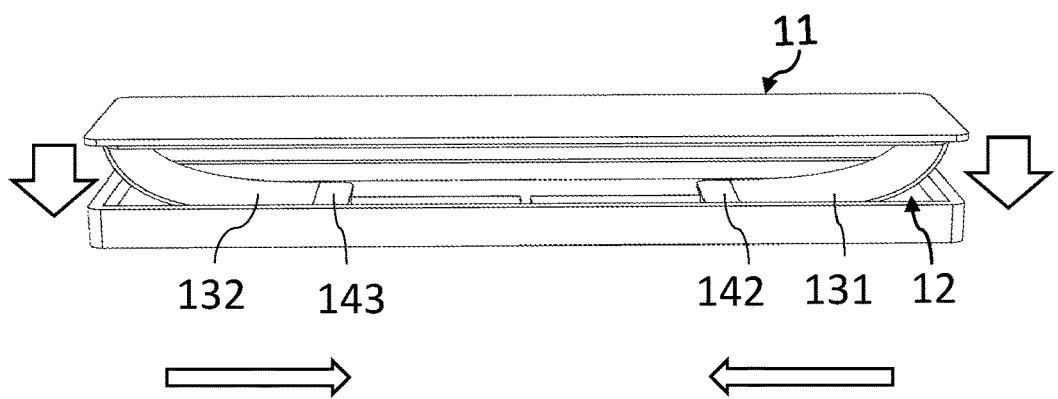
Figure 1E:
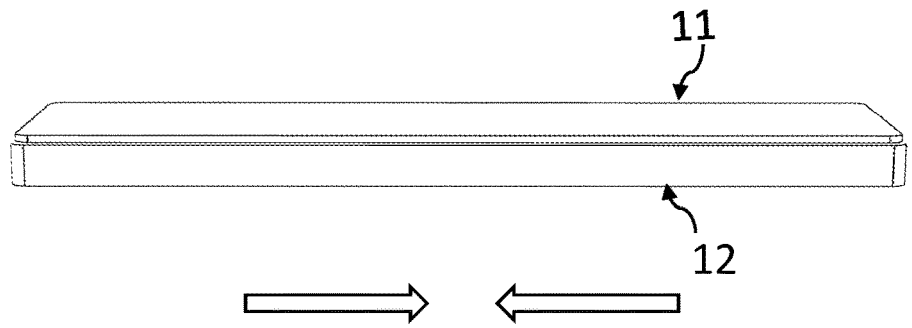

The stand further includes a limiting device, being adapted to guide the second end portion 1312 of the first elastic sheet 131 and the second end portion 1322 of the second elastic sheet 132 to move along a longitudinal direction of the second base 12 within a limited range. The first elastic sheet 131 and the second elastic sheet 132 do not overlap with each other, thereby when the second end portion 1312 of the first elastic sheet 131 and the second end portion 1322 of the second elastic sheet 132 proceed to a first relative displacement, the first base 11 and the second base 12 are driven to form a second relative displacement, as shown in FIGS. 1C, 1D and 1E. Furthermore, each of the first elastic sheet 131 and the second elastic sheet 132 is substantially in a rectilinear shape and has a feature of naturally returning back to its original rectilinear form after being deformed to be curved. When the first relative displacement becomes greater, the first elastic sheet 11 and the second elastic sheet 12 are gradually, elastically deformed to be curved, thereby making the second relative displacement become greater; when the first relative displacement become less, the second relative displacement becomes less too, and the first elastic sheet 11 and the second elastic sheet 12 return to their rectilinear forms.

Specifically, the limiting device includes a slot 141 and two sliding blocks 142, 143. The slot 141 is formed on the second base 12 along the aforementioned longitudinal direction, and has two dead ends 1411, 1412. The two sliding blocks 142, 143 are disposed on the second end portion 1312 of the first elastic sheet 1311 and the second end portion 1322 of the second elastic sheet 132, respectively. Each of the sliding blocks holds two sides 1413, 1414 of the slot 141, in order to slide along the slot 141 within the limited range defined by the slot 141. Preferably, each sliding block 142, 143 does not protrude out of an outer surface 121 of the second base 12. Therefore, when being manufactured, the second base 12 is formed with an opening or recess first, followed by forming the slot 141 in order that each of the sliding blocks 142, 143 does not protrude out of the second base 12. The outer surface 121 of the second base 12 remains smooth and levelled to achieve the purposes of good-looking or easily being attached to the protective case of a cell phone, as shown in FIG. 1B. In addition, one of the first elastic sheet 131 and the second elastic sheet 132 has a length not greater than one half of a length of the first base 112. Preferably, the first elastic sheet 131 and the second elastic sheet 132 have substantially the same length which is not greater than the one half of the first base 11. In the case that the length of each of the first elastic sheet 131 and the second elastic sheet 132 is designed to closer to the one half of the length of the first base 112, the first base 11 can be raised higher. When the two sliding blocks 142, 143 depart from each other and are stopped by the two dead ends 1411, 1412, the first base 11 and the second base 12 form a maximum distance therebetween; when the two sliding blocks 142, 143 slide to be closest to each other, the first base 11 and the second base 12 are adapted to overlap with each other, as shown in FIGS. 1C, 1D and 1E, the schematic views showing their continuous acts. Even more preferable, the slot 141 is provided with a stop portion 1415 at a central portion thereof. When the first base 11 and the second base 12 overlap with each other, the two sliding blocks 142, 143 are adapted to stop at the stop portion 1415, without over sliding. This also prevents the first base 11 and the second base 12 from a "track-slip" along the longitudinal direction.

Figure 2:
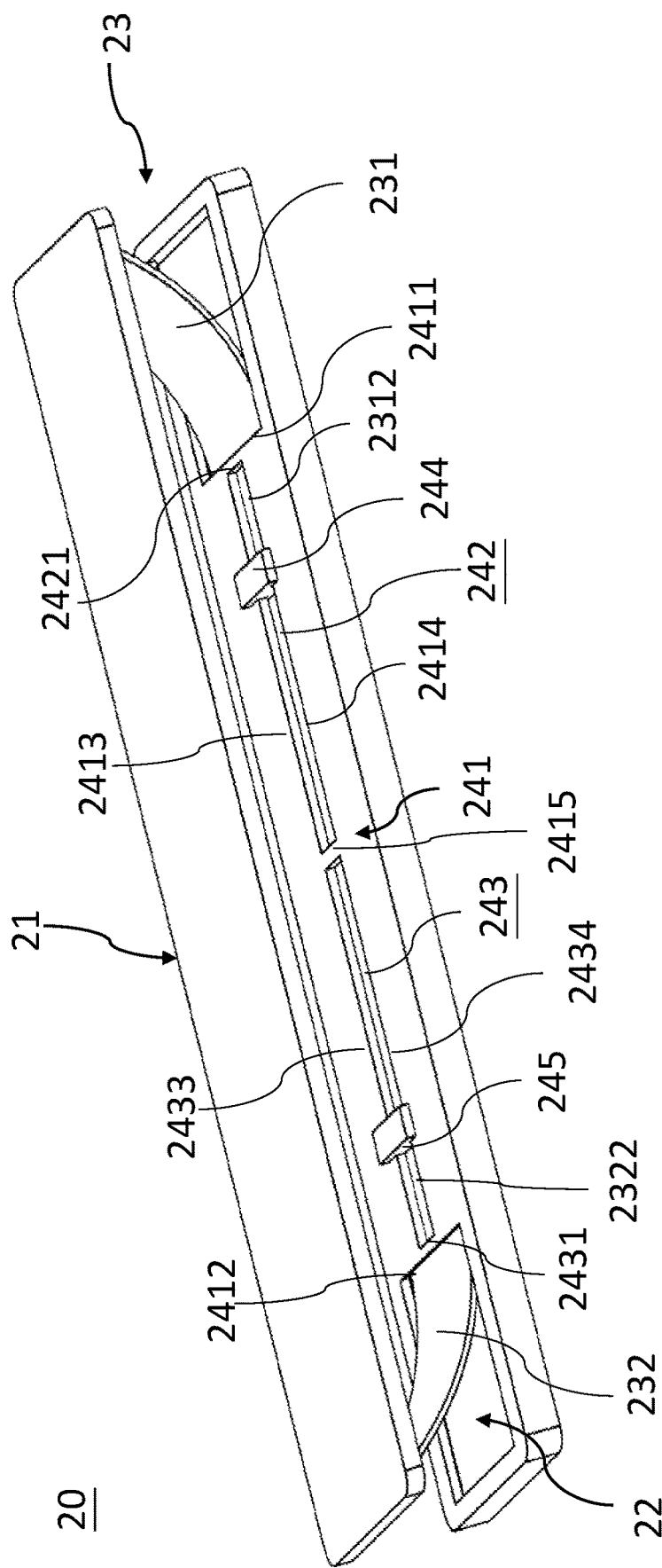
FIG. 2 shows a perspective view of the second embodiment of this invention, in which the stand is in the way of being raised.

The following is the mechanism of the second embodiment which is identical to that of the first embodiment, except that the limiting device of the elevating device 23 is different. Therefore, only the different limiting device is to be described below. The other same components are not repetitively described. In order to clearly point out each element and their relations, FIG. 2, which shows the stand 20 on the way of being raised, is being taken as the representative for illustration. The limiting device includes a cover 241 which is disposed on a central portion of the second base 22 and forms a sliding space with the second base 22. The first elastic sheet 231 is adapted to be entered into the sliding space from being under one 2411 of the ends of the cover 241, whereas the second elastic sheet 232 is adapted to be entered into the sliding space from being under the other 2412 of the ends.

Specifically, the limiting device further comprises a first slot 242 and a second slot 243 both are formed on the cover 241 along the longitudinal direction, respectively have a first dead end 2421 and a second dead end 2431. The limiting device even further comprises a first sliding block 244 and a second sliding block 245. The first sliding block 244 is disposed on the second end portion 2312 of the first elastic sheet 231 and protruding out of the first slot 242 in order to, together with the first elastic sheet 231, hold two sides 2413, 2414 of the first elastic sheet 231, thereby the first elastic sheet 231 is limited to slide along the first slot 242; whereas the second sliding block 245 is disposed on the second end portion 2322 of the second elastic sheet 232 and protruding out of the second slot 243, in order to, together with the second elastic sheet 232, hold two sides 2433, 2434 of the second slot 243, thereby the second sliding block 245 is limited to slide along the second slot 243. More preferably, the cover 241 is provided with a stop portion 2415 at a central portion thereof in order to separate the first slot 242 from the second slot 243. When the first base 21 overlaps the second base 22, the first sliding block 244 and the second sliding block 245 are adapted to stop at the stop portion 2415 to avoid over-sliding, and prevent the first base 21 and the second base 22 produce a "track-slip" along the longitudinal direction.

Same as the first embodiment, in this embodiment, one of the first elastic sheet 231 and the second elastic sheet 232 has a length not greater than one half of a length of the first base 21. Preferably, the first elastic sheet 231 and the second elastic sheet 232 have substantially the same length. When the first sliding block 244 and the second sliding block 245 depart from each other and are stopped by the first dead end 2421 and the second dead end 2431, respectively, the first base 21 and the second base 22 present a maximum distance therebetween; whereas when the first sliding block 244 and the second sliding block 245 slide to be closest to each other, the first base 21 overlaps the second base 22.

Figure 3:
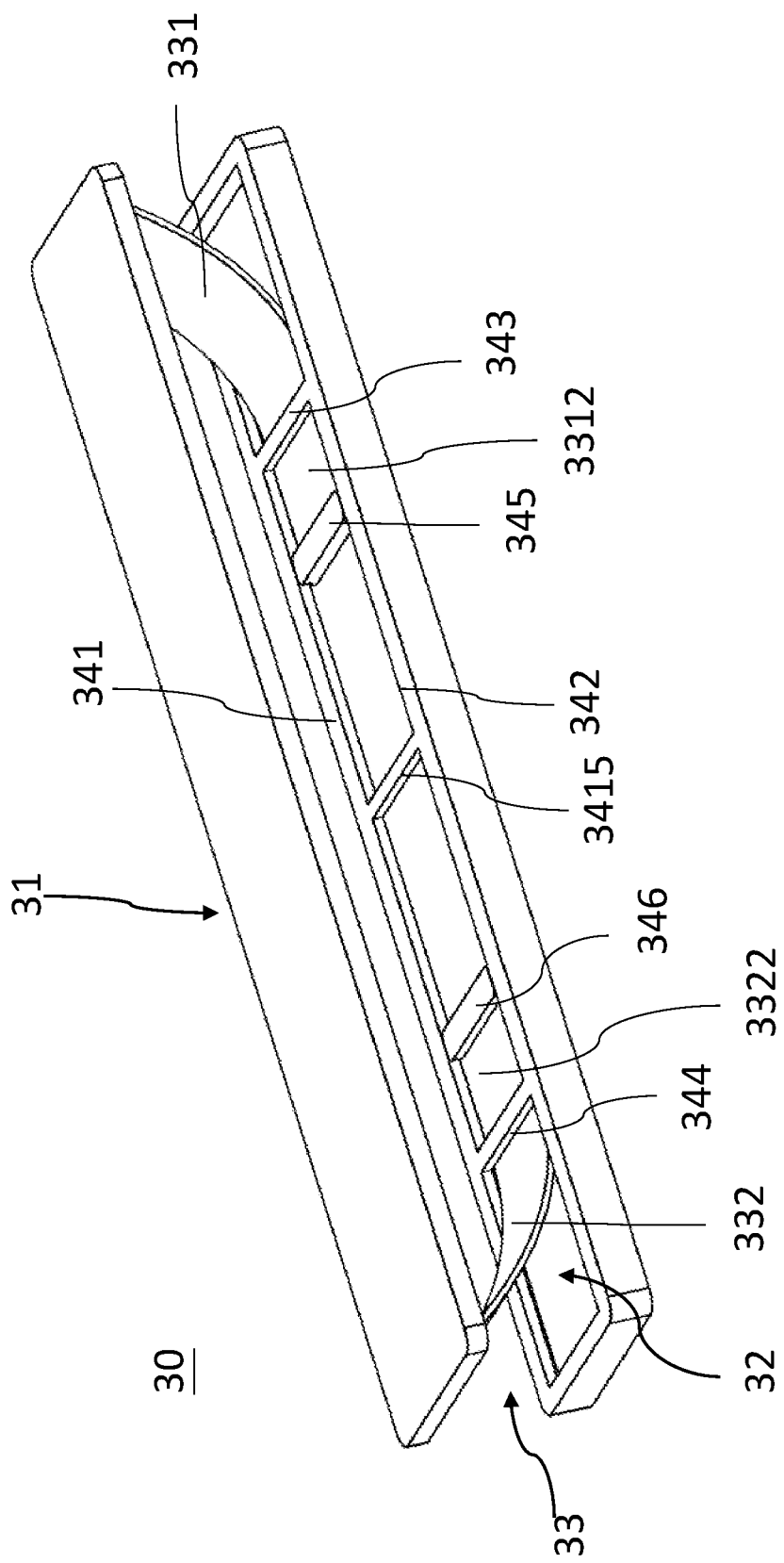
FIG. 3 shows a perspective view of the third embodiment of this invention, in which the stand is in the way of being raised.

The following is the mechanism of the third embodiment which is identical to those of the first and second embodiments, except that the limiting device of the elevating device 33 is different. Therefore, only the different limiting device is to be described below. The other same components are not repetitively described. In order to clearly point out each element and their relations, FIG. 3, which shows the stand 30 on the way of being raised, is being taken as the representative for illustration. The limiting device includes two sidewalls 341, 342 which is disposed on two opposing sides of the second base 32 and forms a sliding space with the second base 32. The limiting device further comprises a first bridge 343, a first sliding block 345, a second bridge 344 and a second sliding block 346. The first bridge 343 crosses on two sidewalls 341, 342 of one of the sides of the second base 32, thereby the first elastic sheet 331 is adapted to be entered into the sliding space from being under the first bridge 343. The first sliding block 345 is disposed on the second end portion 3312 of the first elastic sheet 331 and protrudes toward the first base 31. The second bridge 344 crosses the two sidewalls of 341, 342 of the other of the sides of the second base 32, thereby the second elastic sheet 332 is adapted to be entered into the sliding space from being under the second bridge 344. The second sliding block 346 is disposed the second end portion 3322 of the second elastic sheet 332 and protrudes toward the first base 31.

Similarly, one of the first elastic sheet 331 and the second elastic sheet 332 has a length not greater than one half of a length of the first base 31. Preferably, the first elastic sheet 331 and the second elastic sheet 332 have substantially the same length. The first bridge 343 has an upper surface which is generally in flush with an upper surface of the first sliding block 345; whereas the second bridge 344 has an upper surface which is generally in flush with an upper surface of the second sliding block 346. This way, when the first sliding block 345 and the second sliding block 346 depart from each other and are stopped by the first bridge 343 and the second bridge 344, respectively, the first base 31 and the second base 32 present a maximum distance therebetween; whereas when the first sliding block 345 and the second sliding block 346 slide to be closest to each other, the first base 31 and the second base 32 overlaps each other. More preferably, the limiting device further comprises a stop portion 3415 which is disposed at a central portion of the second base 32, and crosses on the two sidewalls 341, 342. When the first base 31 and the second base 32 overlaps with each other, the first sliding block 345 and the second sliding block 346 are adapted to stop at the stop portion 3415 to avoid over-sliding, and prevent the first base 31 and the second base 32 from a "track-slip" along the longitudinal direction.

Figure 4A:
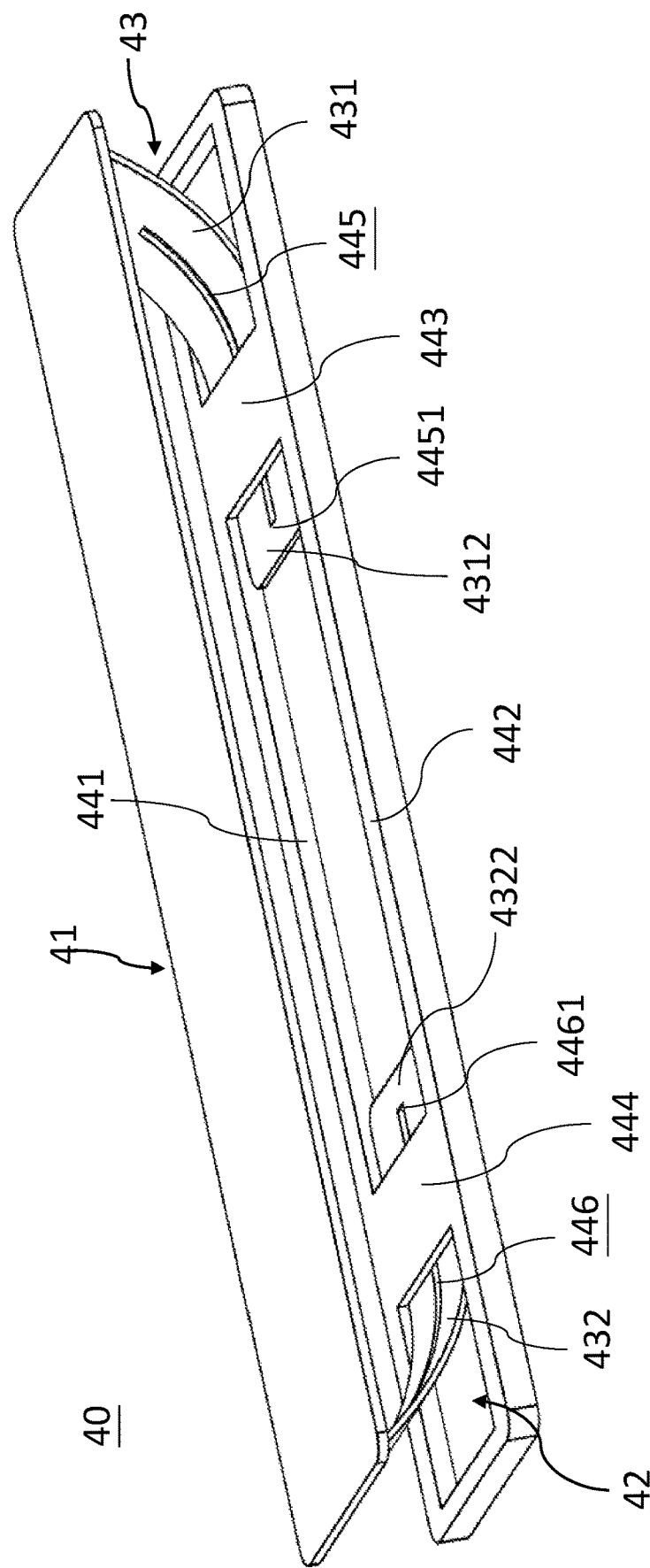
FIG. 4A shows a perspective view of the fourth embodiment of this invention, in which the stand is in the way of being raised.
Figure 4B:
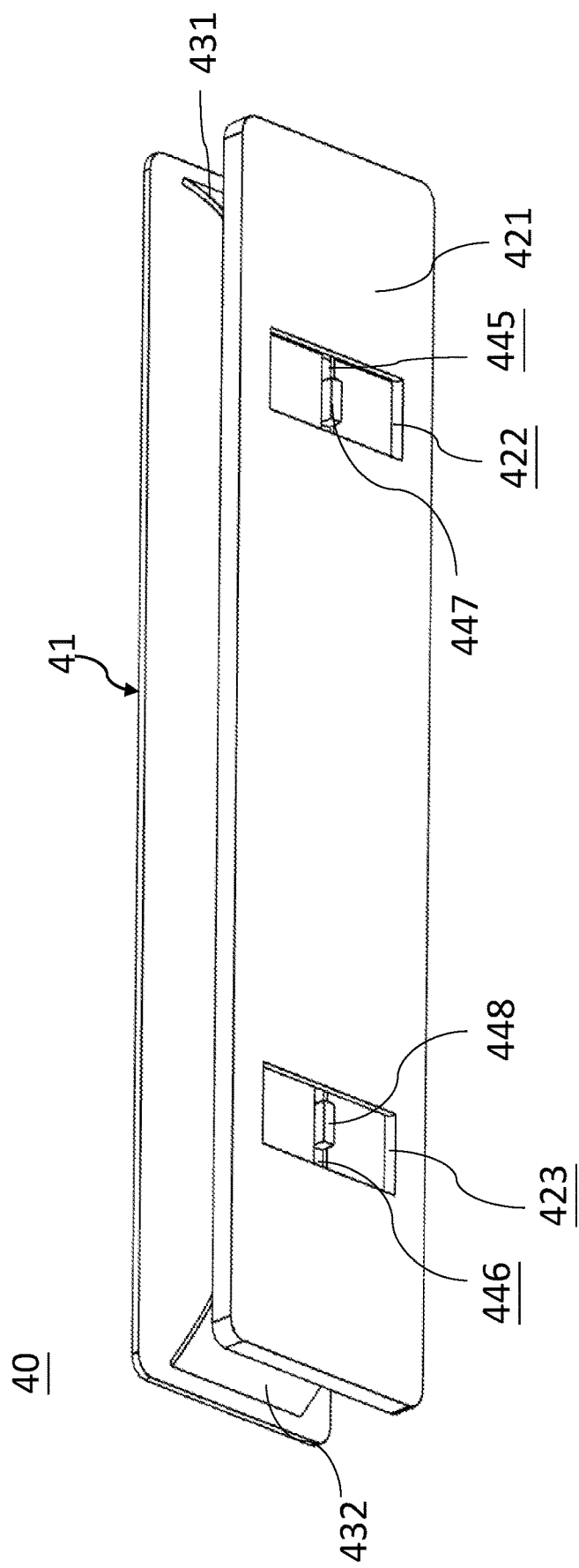
FIG. 4B shows another perspective view of the second embodiment of this invention, in which the stand is in the way of being raised.

The following is the mechanism of the fourth embodiment which is identical to those of the first, second and third embodiments, except that the limiting device of the elevating device 43 is different. Therefore, only the different limiting device is to be described below. The other same components are not repetitively described. In order to clearly point out each element and their relations, FIGS. 4A and 4B, which show the stand 40 on the way of being raised, is being taken as the representative for illustration. The limiting device includes two sidewalls 441, 442, a first bridge 443, a first slot 445, and a first sliding block 447. The two sidewalls 441, 442 are disposed on two opposing sides of the second base 42 and form a sliding space with the second base 42. The first bridge 443 crosses on the two sidewalls 441, 442 of one of the sides of the second base 42, thereby the first elastic sheet 431 is adapted to be entered into the sliding space from being under the first bridge 443. The first slot 445 is formed on the first elastic sheet 431 along a longitudinal direction of the first elastic sheet 431, and has a first dead end 4451. The first sliding block 447 is disposed under the first bridge 443 and goes through the first slot 445, thereby the first elastic sheet 431 is limited to slide along the first slot 445. Same as the first embodiment, the first sliding block 447 does not protrude out of an outer surface 421 of the second base 42. Therefore, when being manufactured, the second base 42 is formed with a first opening 422 first. More preferably, the limiting device symmetrically comprises a second bridge 444 crossing on the two sidewalls 441, 442 of the other of the sides of the second base 42, thereby the second elastic sheet 432 is adapted to be entered into the sliding space from being under the second bridge 444. The second slot 446 is formed on the second elastic sheet 432 along a longitudinal direction of the second elastic sheet 432, and has second dead end 4461. The second sliding block 448 is disposed under the second bridge 444 and goes through the second slot 446, thereby the second elastic sheet 432 is limited to slide along the second slot 446. Similarly, the second sliding block 448 does not protrude out of the outer surface 421 of the second base 42. Therefore, when being manufactured, the second base 42 is formed with a second opening 423 first to sustain the outer surface 421 to be smooth and levelled. This also gets a better-looking and makes it convenient to be attached to a handheld device.

Similarly, one of the first elastic sheet 431 and the second elastic sheet 432 has a length not greater than one half of a length of the first base. Preferably, the first elastic sheet 431 and the second elastic sheet 432 have substantially the same length. When the second end portion 4312 of the first elastic sheet 431 and the second end portion 4322 of the second elastic sheet 432 depart from each other and are stopped by the first dead end 4451 and the second dead end 4461, respectively, the first base 41 and the second base 42 present a maximum distance therebetween; whereas when the second end portion 4312 of the first elastic sheet 431 and the second end portion 4322 of the second elastic sheet 432 are closest to each other, the first base 41 overlaps the second base 42.

This invention is not limited to the above-mentioned embodiments whose first elastic sheet and second elastic sheet are arranged in an end-to-end manner at two opposing ends of the first base (or the second base). Face-to-face arrangement in a staggered manner for the first elastic sheet and the second elastic sheet are feasibly optional. Specifically, the first elastic sheet and the second elastic sheet remain unchanged in a rectilinear shape, but the relation of their relative displacements will be opposite. That is, when the first relative displacement becomes less (i.e., the second end portion of the first elastic sheet and the second end portion of the second elastic sheet are close to each other), thereby the second relative displacement becomes greater (i.e., The first base and the second base departs from each other). The limiting device will make the first elastic sheet and the second elastic sheet be deformed to be curved. Opposingly, when the first relative displacement becomes greater, the first elastic sheet and the second elastic sheet gradually, elastically return back to be rectilinear, thereby the second relative displacement becomes less. The following are two embodiments illustrating this type of limiting device.

Figure 5A:
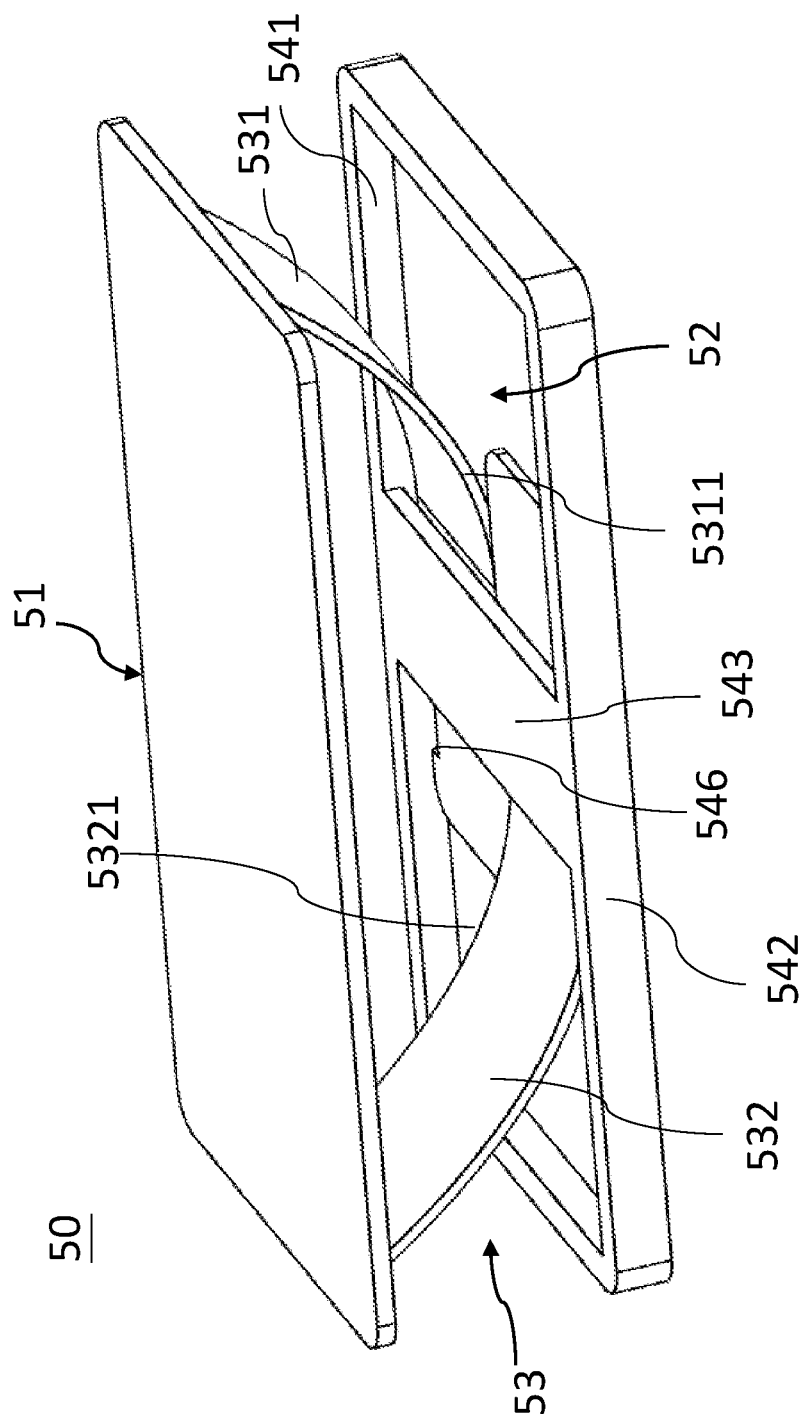
FIG. 5A shows a perspective view of the fifth embodiment of this invention, in which the stand is in the way of being raised.
Figure 5B:
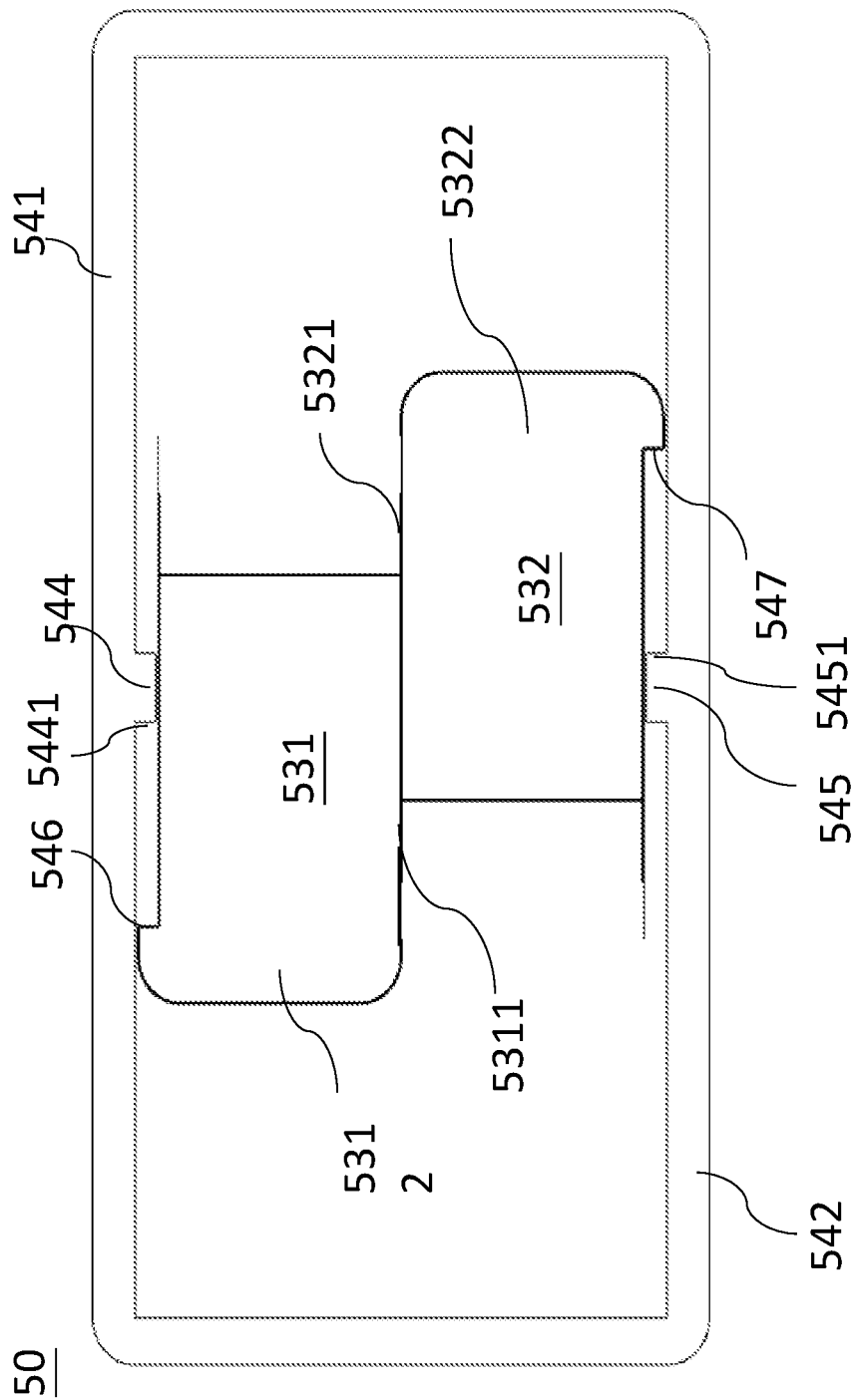
FIG. 5B is a planar schematic view showing the relation between the sliding block and the dead end under the bridge of FIG. 5A.

The following is the mechanism of the fifth embodiment which is similar to the previous embodiments, except that the limiting device of the elevating device 53 is different. Therefore, only the different limiting device is to be described below. The other same components are not repetitively described. In order to clearly point out each element and their relations, FIG. 5A, which show the stand 50 on the way of being raised, is being taken as the representative for illustration. The limiting device comprises two sidewalls 541, 542 and a bridge 543. The two sidewalls 541, 542 are disposed on two opposing sides of the second base 52. The bridge 543 crosses on a central portion between the two sidewalls 541, 542 of the second base 52, and forms a sliding space with the second base 52, thereby the first elastic sheet 531 and the second elastic sheet 532 are adapted to be entered into the sliding space from being under two opposing sides of the bridge 543, respectively. Further in reference to FIG. 5B, the limiting device further comprises a first bump 544 and a first sliding block 546. The first bump 544 is disposed on an inner side of the sidewall 541 and under the bridge 543. The first bump 544 is formed with a first dead end 5441 at a side thereof. Therefore, the first elastic sheet 531 is limited to slide between the first bump 544 and an outer side 5321 of the second elastic sheet 532. The first sliding block 546 is formed at an outer side of the second end portion 5312 of the first elastic sheet 531. Analogically, the limiting device of this embodiment further includes a second bump 545 and a second sliding block 547. The second bump 545 is disposed on an inner side of the other sidewall 542 and under the bridge 543, and formed with a second dead end 5451 at a side thereof. The second elastic sheet 532 is limited to slide between the second bump 545 and an outer side of the first elastic sheet 531. The second sliding block 547 is formed an outer side of the second end portion 5322 of the second elastic sheet 532. In some other optional embodiments, the bridge 543 is provided with a partition therebelow (not shown), so as to space the first elastic sheet 531 apart from the second elastic sheet 532, thereby avoiding potential interference between the first elastic sheet 531 and the second elastic sheet 532 when moving along their longitudinal directions and enhancing the product reliability. In this option, the first elastic sheet 531 is limited to slide between the first bump 544 and the partition; whereas the second elastic sheet 532 is limited to slide between the second bump 545 and the partition.

One of the first elastic sheet 531 and the second elastic sheet 532 has a length less than a length of the first base 51, and not less than one half of the length of the first base 51. Preferably, the first elastic sheet 531 and the second elastic sheet 532 have substantially the same length which is less than the length of the first base 51 and not less than one half of the length of the first base 51. When the second end portion 5312 of the first elastic sheet 531 and the second end portion 5322 of the second elastic sheet 532 are close to each other, and are stopped by the first bump 544 and the second bump 545, respectively, the first base 51 and the second base 52 present a maximum distance therebetween; whereas when the second end portion 5312 of the first elastic sheet 531 and the second end portion 5322 of the second elastic sheet 532 are furthest away from each other, the first base 51 overlaps the second base 52.

Figure 6:
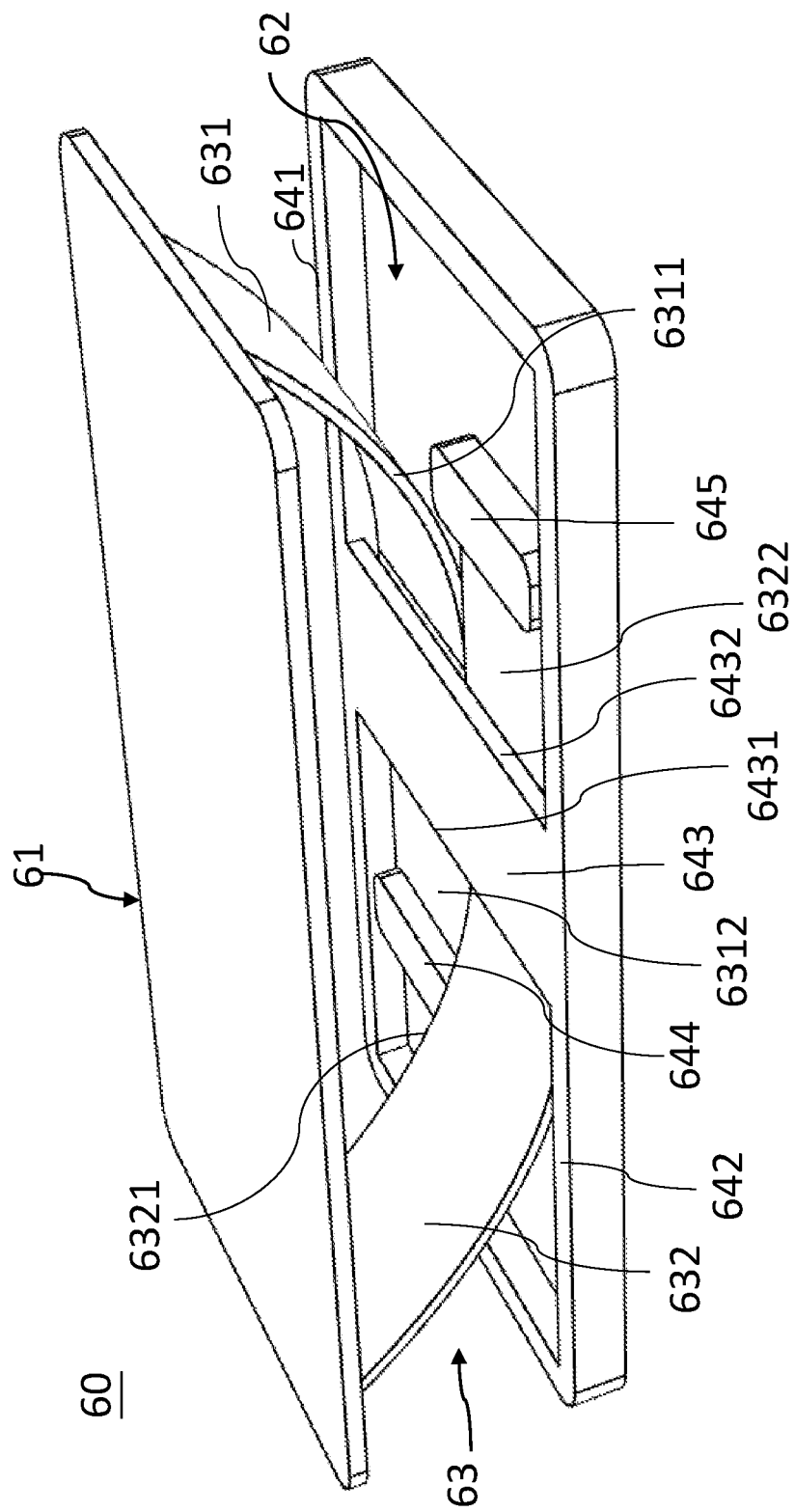
FIG. 6 shows a perspective view of the sixth embodiment of this invention, in which the stand is in the way of being raised.

The following is the mechanism of the fifth embodiment which is similar to the previous embodiments, except that the limiting device of the elevating device 63 is different. Therefore, only the different limiting device is to be described below. The other same components are not repetitively described. In order to clearly point out each element and their relations, FIG. 6, which show the stand 60 on the way of being raised, is being taken as the representative for illustration. The limiting device includes two sidewalls 641, 642, a bridge 643, a first sliding block 644 and a second sliding block 645. The two sidewalls 641, 642 are disposed on two opposing sides of the second base 62. The bridge 643 crosses on a central portion between the sidewalls 641, 642, and form a sliding space with the second base 62, thereby the first elastic sheet 631 and the second elastic sheet 632 are adapted to enter in the sliding space from be under the two opposing sides of the bridge 643. The first sliding block 644 is disposed on the second end portion 6312 of the first elastic sheet 631 and protrudes toward the first base 61, thereby the first elastic sheet 631 is limited to slide between the sidewall 641 and an outer side of the second elastic sheet 632. The bridge 643 is formed with a first dead end 6431 at one of the sides thereof and is formed with a second dead end 6432 at the other of the sides thereof. The second sliding block 645 is disposed on the second end portion 6322 of the second elastic sheet 632 and protruded toward the first base 61, thereby the second elastic sheet 632 is limited to slide between the other sidewall 642 and an outer side of the first elastic sheet 631.

One of the first elastic sheet 631 and the second elastic sheet 632 has a length less than a length of the first base 61, and not less than one half of the length of the first base 61. Preferably, the first elastic sheet 631 and the second elastic sheet 632 have substantially the same length. In addition, the bridge 643 has an upper surface which is in flush with an upper surface of the first sliding block 644, thereby when the second end portion 6312 of the first elastic sheet 631 and the second end portion 6322 of the second elastic sheet 632 are close to each other, and the first sliding block 644 and the second sliding block 645 are stopped by the first dead end 6431 and the second dead end 6432 of the bridge 643, respectively, the first base 61 and the second base 62 present a maximum distance therebetween; whereas when the second end portion 6312 of the first elastic sheet 631 and the second end portion 6322 of the second elastic sheet 632 are furthest away from each other, the first base 61 overlaps the second base 62. In some other alternatives, the bridge 643 can be provided with a partition therebelow (not shown), in order to space the first elastic sheet 631 apart from the second elastic sheet 632, thereby avoiding the undesired interference between the first elastic sheet 631 and the second elastic sheet 632 when they move along their longitudinal directions, and enhancing the product reliability. In this alternative, the first elastic sheet 631 is limited to slide the sidewall 641 and the partition; whereas the second elastic sheet 632 is limited to slide between the sidewall 642 and the partition.

Figure 7:
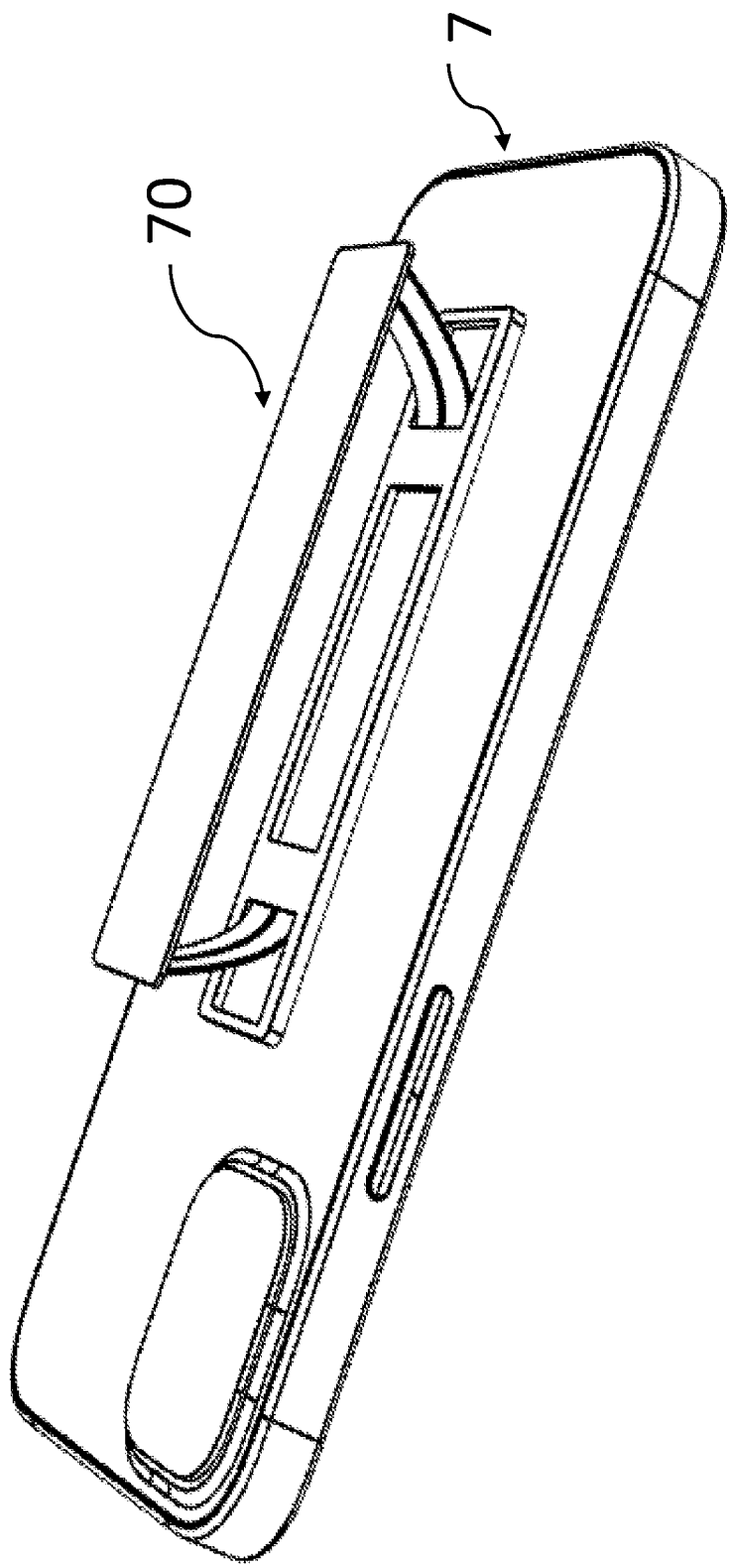
FIG. 7 is a state-of-use view showing the stand of this invention being attached to a cell phone.
Figure 8:
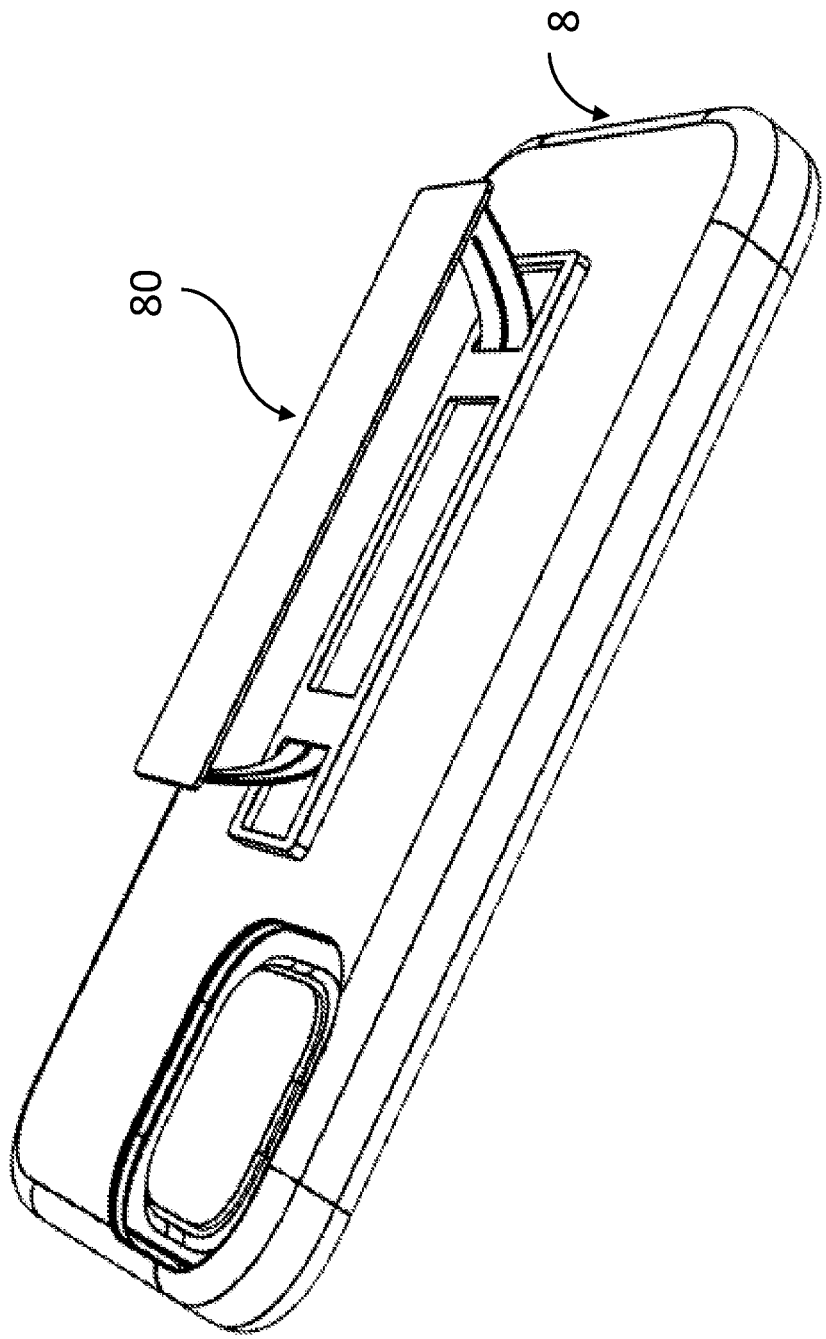
FIG. 8 is a state-of-use view showing the stand of this invention being attached to a protective case of a cell phone.
Figure 9:
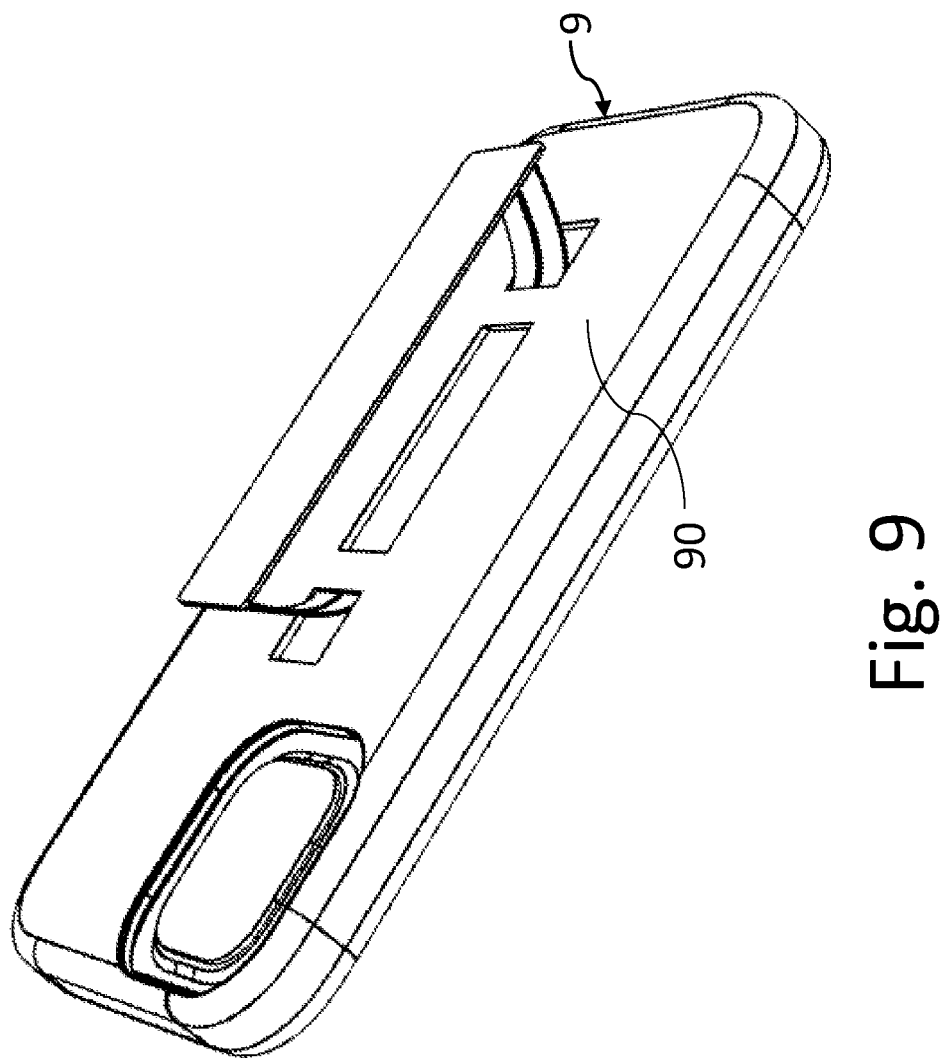
FIG. 9 is a state-of-use view showing the stand of this invention being embedded with a protective case of a cell phone.

The above descriptions refer to various embodiments of stands of this invention. The stand of each embodiment can be provided with an attaching device (not shown) on an outer surface of one of the first base and the second base thereof. The attaching device can be a glue, a double-sided tape, reusable PU glue or any kinds of magnet device such as a regular metal magnet, a rubber-based magnet or a reinforced Nd—Fe—B magnet. It can be temporarily or permanently attached to the back of the handheld device 7 and the protective case 8, as the ways the stand 70 and the stand 80 show in FIG. 7 and FIG. 8, respectively. The stand can be embedded with the protective case or integrated with the protective case to be a part of the protective case thereby forming a protective case with its own stand, in order to increase the functionality of product. As shown in FIG. 9, it is so presented by integrating, for example, the second base 42 of the stand 40 of the fourth embodiment with the back 90 of the protective case 9. Furthermore, the other of the first base and the second base can also be attached with an attaching device on an outer surface thereof by a similar manner. The attaching device can be a magnet too. Letting the other of the first base and the second base be made from magnetic material is also feasible so as to be temporarily attached to a support base which is designed to be ready to fit. The support base can be for example, a support which is capable of clipping on the ventilating grille or dashboard of a vehicle.

The above is described for making various feasible examples of how this invention is embodied so as to interpret the common technical features, but not for limiting the technical measures of this invention. As a matter of fact, this invention provides means for supporting a handheld device by using two devices which are independent of each other, and do not overlap with each other all the way in operation, to let a first base be raised or lowered relative to a second base. This invention also provides another means for limiting the first base, relative to the second base, to be raised to a first dead point (i.e., the dead end of each embodiment) and lowered to a second dead which is, for example, the second base itself, its sidewalls, or the contact where the second end portion of first elastic sheet and the second end portion of the second elastic sheet). On top of the above embodiments fully describing the structure, materials and acts of carrying out the means, the following descriptions are further provided with some alternatives so as to identifying their equivalents; however, those equivalents make no effect to limit the subject matters set forth in the claims:

1) The first elastic sheet and second elastic sheet can have different dimensions, materials and locations. They are not necessarily symmetrical as shown in the figures, either in shape or in the operational acts when the stand is raised to be opened or lowered to be folded-up, provided that the first elastic sheet and the second elastic sheet can be operated in a manner of not surface-overlapping with each other, because this arrangement helps out the stand being well utilized for supporting a larger sized handheld device.
2) To have the stand be more stable and reliable in operation from a fold-up state to an open state, each of the first elastic sheet and the second elastic sheet preferably has a thickness of between 0.08 mm to 2 mm, more preferably, between 0.2 mm to 1.0 mm. The material that the first elastic sheet or the second elastic sheet is made of is not limited. Metallic, plastic or any kind of compound material is acceptable. If made of plastic material, setting its Elasticity Module between 1 Gpa to 5 Gpa are recommended, and if made of metallic material, setting its Elasticity Module between 70 Gpa to 195 Gpa is recommended.
3) Because each of the first elastic sheet and the second elastic sheet is capable of elastically returning back to its rectilinear form, when the stand is fully opened in use, the second end portion provides a maximum perpendicular pushing force onto the second base, which makes the stand tend to stop at the fully opened state; whereas when the stand is in the state of fully folded-up when not in use, the stand tends to stop at the fold-up state because the first elastic sheet and the second elastic sheet have returned back to their original rectilinear forms. This way, obvious two-staged feeling between the fully opened and the fully fold-up is presented according to the mechanism of this invention. Furthermore, because the first elastic sheet and the second elastic sheet are guided by the limiting device, specific frictions existing between the two sheets, and the elements contacting the two sheets, such as the second base, sidewalls, cover or bridge(s). In a more functional design, increasing the aforesaid friction may further provide that the stand is able to be stopped anywhere during the operation of the user when raising or lowering the first base relative to the second base.

What is claimed is:
1. A stand for use with a handheld device, comprising:
a first base, and a second base opposing to the first base;
an elevating device disposed between the first base and the second base; the elevating device including:
a first elastic sheet, having a first end portion and a second end portion, in which the first end portion is connected to a first area of the first base;

a second elastic sheet, having a first end portion and a second end portion, in which the first end portion is connected to a second area of the first base; and a limiting device, being adapted to guide the second end portion of the first elastic sheet and the second end portion of the second elastic sheet to move along a longitudinal direction of the second base within a limited range, and the first elastic sheet and the second elastic sheet not being overlapping with each other; thereby when the second end portion of the first elastic sheet and the second end portion of the second elastic sheet proceed to a first relative displacement, the first base and the second base are driven to form a second relative displacement.

2. The stand as claimed in claim 1, wherein each of the first elastic sheet and the second elastic sheet is shaped as being rectilinear, when the first relative displacement becomes greater, the first elastic sheet and the second elastic sheet are elastically deformed into being curved, thereby the second relative displacement becomes greater; when the first relative displacement becomes less, the second relative displacement becomes less, thereby the limiting device makes each of the first elastic sheet and the second elastic sheet return to be rectilinear.

3. The stand as claimed in claim 2, wherein the first area refers to an inner side of one of two ends of the first base, and the second area refers to an inner side of the other of the two ends of the first base.

4. The stand as claimed in claim 3, wherein the limiting device includes:
 a slot, formed on the second base along the longitudinal direction thereof, and having two dead ends; and
 two sliding blocks, disposed on the second end portion of the first elastic sheet and the second end portion of the second elastic sheet, respectively; wherein each of the sliding blocks is adapted to hold two sides of the slot in order to move along the slot within the limited range, in which each of the sliding blocks does not protrude out of an outer surface of the second base.

5. The stand as claimed in claim 4, wherein one of the first elastic sheet and the second elastic sheet has a length being not greater than one half of a length of the first base.

6. The stand as claimed in claim 5, wherein the first elastic sheet and the second elastic sheet have substantially the same length which is not greater than one half of the length of the first base; when the two sliding blocks depart from each other and are stopped by the two dead ends, respectively, the first base and the second base present a maximum distance; when the two sliding blocks are closest to each other, the first base overlaps with the second base.

7. The stand as claimed in claim 3, wherein the limiting device includes:
 a cover, disposed on a central portion of the second base and forming a sliding space with the second base, whereby the first elastic sheet is adapted to be entered into the sliding space from being under one of ends of the cover, and the second elastic sheet is adapted to enter the sliding space from being under the other of the ends of the cover;
 a first slot, formed on the cover along the longitudinal direction and having a first dead end;
 a first sliding block, disposed on the second end portion of the first elastic sheet, and protruding out of the first slot to hold two sides of the first slot together with the first elastic sheet, thereby the first elastic sheet is limited to slide along the first slot;
 a second slot, formed on the cover along the longitudinal direction, and having a second dead end;
 a second sliding block, disposed on the second end portion of the second elastic sheet, and protruding out of the second slot to hold two sides of the second slot together with the second elastic sheet, thereby the second sliding block is limited to slide along the second slot.

8. The stand as claimed in claim 7, wherein one of the first elastic sheet and the second elastic sheet has a length not greater than one half of a length of the first base.

9. The stand as claimed in claim 8, wherein the first elastic sheet and the second elastic sheet have the same length which is not greater than one half of the length of the first base; when the first sliding block and the second sliding block depart from each other and are stopped by the first dead end and the second dead end, respectively, the first base and the second base present a maximum distance; when the first sliding block and the second sliding block slide to be closest to each other, the first base overlaps the second base.

10. The stand as claimed in claim 3, wherein the limiting device includes:
 two sidewalls, disposed on two opposing sides of the second base, and forming a sliding space with the second base;
 a first bridge, crossing on two sidewalls at one of two sides of the second base, thereby the first elastic sheet is adapted to be entered into the sliding space from being under the first bridge;
 a first sliding block, disposed on the second end portion of the first elastic sheet;
 a second bridge, crossing on the two sidewalls at the other of the two sides of the second base, thereby the second elastic sheet is adapted to be entered into the sliding space from being under the second bridge; and
 a second sliding block, disposed on the second end portion of the second elastic sheet.

11. The stand as claimed in claim 10, wherein one of the first elastic sheet and the second elastic sheet has a length not greater than one half of a length of the first base.

12. The stand as claimed in claim 11, wherein the first elastic sheet and the second elastic sheet have the same length which is not greater than one half of the length of the first base; when the first sliding block and the second sliding block depart from each other and are stopped by the first bridge and the second bridge, respectively, the first base and the second base present a maximum distance; when the first sliding block and the second sliding block slide to be closest to each other, the first base overlaps the second base.

13. The stand as claimed in claim 3, wherein the limiting device includes:
 two sidewalls, disposed on two opposing sides of the second base and forming a sliding space with the second base;
 a first bridge, crossing on two sidewalls at one of two sides of the second base, thereby the first elastic sheet is adapted to be entered into the sliding space from being under the first bridge;
 a first slot, disposed on the first elastic sheet along a longitudinal direction thereof, and having a first dead end;
 a first sliding block, disposed under the first bridge and going through the first slot, thereby the first elastic sheet is limited to slide along the first slot; wherein the first sliding block does not protrude out of an outer surface of the second base;

a second bridge, crossing on the two sidewalls at the other of the two sides of the second base, thereby the second elastic sheet is adapted to be entered into the sliding space from being under the second bridge;

a second slot, disposed on the second elastic sheet along a longitudinal direction thereof, and having a second dead end; and a second sliding block, disposed under the second bridge and going through the second slot, thereby the second elastic sheet is limited to slide along the second slot; wherein the second sliding block does not protrude out of the outer surface of the second base.

14. The stand as claimed in claim 13, wherein one of the first elastic sheet and the second elastic sheet has a length not greater than one half of a length of the first base.

15. The stand as claimed in claim 14, wherein the first elastic sheet and the second elastic sheet have the same length which is not greater than one half of the length of the first base; when the second end portion of the first elastic sheet and the second end portion of the second elastic portion depart from each other and are stopped by the first dead end and the second dead end, respectively, the first base and the second base present a maximum distance; when the second end portion of the first elastic sheet and the second end portion of the second elastic portion slide to be closest to each other, the first base overlaps the second base.

16. The stand as claimed in claim 1, wherein each of the first elastic sheet and the second elastic sheet is shaped as being rectilinear, when the first relative displacement becomes less, the first elastic sheet and the second elastic sheet are elastically deformed into being curved, thereby the second relative displacement becomes greater; when the first relative displacement becomes greater, the second relative displacement becomes less, thereby each of the first elastic sheet and the second elastic sheet returns to be rectilinear.

17. The stand as claimed in claim 16, wherein the first area refers to an inner side of one of two ends of the first base, and the second area refers to an inner side of the other of the two ends of the first base.

18. The stand as claimed in claim 17, wherein the limiting device includes:
two sidewalls, disposed on two opposing sides of the second base;
a bridge, crossing between two sidewalls at a central portion of the second base and forming a sliding space with the second base, whereby the first elastic sheet and the second elastic sheet are adapted to enter the sliding space from being under two opposing sides of the bridge;
a first sliding block, disposed on the second end portion of the first elastic sheet, thereby the first elastic sheet is limited to slide between one of the sidewalls and an outer side of the second elastic sheet;
a first dead end, formed on one of sides of the bridge;
a second sliding block, disposed on the second end portion of the second elastic sheet, thereby the second elastic sheet is limited to slide between the other of the sidewalls and an outer side of the first elastic sheet; and
a second dead end, formed on the other of sides of the bridge.

19. The stand as claimed in claim 18, wherein one of the first elastic sheet and the second elastic sheet has a length less than a length of the first base, and not less than one half of the length of the first base.

20. The stand as claimed in claim 19, wherein the first elastic sheet and the second elastic sheet have substantially the same length which is less than a length of the first base, and not less than one half of the length of the first base; when the second end portion of the first elastic sheet and the second end portion of the second elastic sheet are close to each other, and the first sliding block and the second sliding block are stopped by the bridge, the first base and the second base present a maximum distance; when the second end portion of the first elastic sheet and the second end portion of the second elastic sheet are furthest away from each other, the first base overlaps with the second base.

21. The stand as claimed in claim 17, wherein the limiting device includes:
two sidewalls, disposed on two opposing sides of the second base;
a bridge, disposed between two sidewalls of a central portion of the second base and forming a sliding space with the second base, whereby the first elastic sheet and the second elastic sheet are adapted to be entered into the sliding space from being under the two opposing ends of the bridge;
a first bump, formed on an inner side of one of the sidewalls under the bridge, and the first bump being formed with a first dead end, thereby the first elastic sheet is limited to slide between the first dead end and an outer side of the second elastic sheet;
a first sliding block, disposed on an outer side of the second end portion of the first elastic sheet;
a second bump, formed on an inner side of the other of the sidewalls under the bridge, and the second bump being formed with a second dead end, thereby the second elastic sheet is limited to slide between the second dead end and an outer side of the first elastic sheet; and
a second sliding block, disposed on an outer side of the second end portion of the second elastic sheet.

22. The stand as claimed in claim 21, wherein one of the first elastic sheet and the second elastic sheet has a length less than a length of the first base, and not less than one half of the length of the first base.

23. The stand as claimed in claim 22, wherein the first elastic sheet and the second elastic sheet have substantially the same length which is less than a length of the first base, and not less than one half of the length of the first base; when the second end portion of the first elastic sheet and the second end portion of the second elastic sheet are close to each other, and the first sliding block and the second sliding block are stopped by the first dead end and the second dead end, respectively, the first base and the second base present a maximum distance; when the second end portion of the first elastic sheet and the second end portion of the second elastic sheet are furthest away from each other, the first base overlaps with the second base.

24. The stand as claimed in claim 1, further comprising an attaching device disposed on an outer surface of at least one of the first base and the second base.

25. The stand as claimed in claim 24, wherein the attaching device is one of a double-sided tape, a usable PU glue and a magnet device.

26. A protective case for use with a handheld device, comprising a stand for use with a handheld device, comprising a first base, and a second base opposing to the first base; an elevating device disposed between the first base and the second base; the elevating device including:
a first elastic sheet, having a first end portion and a second end portion, in which the first end portion is connected to a first area of the first base;
a second elastic sheet, having a first end portion and a second end portion, in which the first end portion is connected to a second area of the first base; and a limiting device, being adapted to guide the second end portion of the first elastic sheet and the second end portion of the second elastic sheet to move along a longitudinal direction of the second base within a limited range, and the first elastic sheet and the second elastic sheet not being overlapping with each other; thereby when the second end portion of the first elastic sheet and the second end portion of the second elastic sheet proceed to a first relative displacement, the first base and the second base are driven to form a second relative displacement;

wherein the protective case has a back and wherein one of the first base and the second base is a part of the back.

* * * * *